Figure 1:
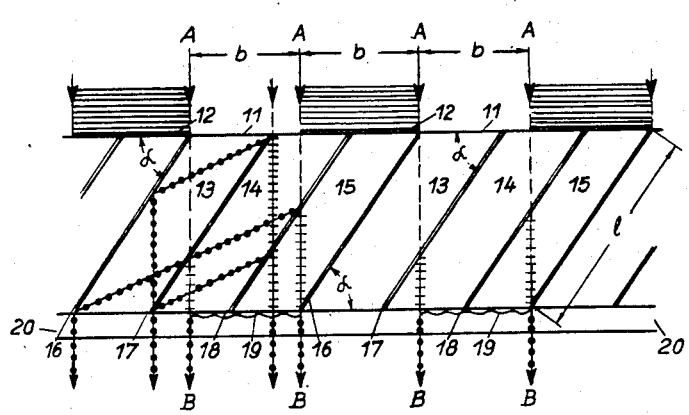

Jan. 13, 1959  W. GEFFCKEN ET AL  2,868,076
POLARIZER FOR PRODUCING UNIFORMLY POLARIZED
LIGHT WITH AID OF INTERFERENCE POLARIZERS
AND PHASE RETARDERS
Filed May 13, 1953  2 Sheets-Sheet 1

United States Patent Office 2,868,076
Patented Jan. 13, 1959

2,868,076

POLARIZER FOR PRODUCING UNIFORMLY POLARIZED LIGHT WITH AID OF INTERFERENCE POLARIZERS AND PHASE RETARDERS

Walter Geffcken and Hubert Schroeder, Landshut, Bavaria, Germany, assignors to Jenaer Glaswerk Schott & Gen., Mainz, Germany Application May 13, 1953, Serial No. 354,702

Claims priority, application Germany May 17, 1952

24 Claims. (Cl. 88—65)

The invention constitutes a further development of interference polarizers dealt with in our copending application Ser. No. 212,725, now Patent 2,748,659, issued June 5, 1956, for the generation of uniformly polarized light by means of interference polarizers and phase retarders, preferably for headlights and stereoprojectors where the boundaries traversed by the in- and out-going light rays form two planes parallel to each other, which preferably run perpendicular to the oncoming light rays and where the light entrance surface has alternately bands impervious to light and light transmitting bands. By means of such interference polarizers a conversion of natural light into linearly or elliptically polarized light of uniform direction of vibration and propagation is possible without substantial losses. Interference polarizers of this type have already become known which consist of a system of thin layers of alternately high and low refractive indices lying between suitable light refracting masses, e. g. of glass, which layers are traversed by light at an angle of incidence $\alpha=45°$. The angle of incidence of 45° was chosen for these polarizers because in this way it is easy to design especially favourable arrangements where the interference polarizing and deviation system is combined in a close and coherent body whose plane surfaces are perpendicular to the in- and out-going light rays. On the other hand, they have the disadvantage that since the angle of incidence $\alpha$ is subject to the equation (1)     $\sin^2\alpha = n_h^2 \cdot n_t^2 / n_g^2(n_h^2 + n_t^2)$ whereby $n_h$ is the refractive index of the high refracting, $n_t$ the refractive index of the low refracting layers of the polarizer and $n_g$ is the refractive index of the surrounding glass bodies, if $\alpha=45°$, the refractive index of the surrounding glass must be $n_g = \sqrt{2} \cdot n_h \cdot n_t / \sqrt{n_h^2 + n_t^2}$ which, owing to the small choice of values technically available for $n_h$ and $n_t$, brings about values of $n_g=1.65$. These solutions thus presuppose the use of expensive, heavy special glasses.

It is an object of the invention to create a polarizer forming a body of normal glass or plastic material having no light losses, for instance by total reflection.

For this purpose in the polarizer are arranged interference layers and reflecting layers as well as phase retarding foils, light transmitting bodies carrying said layers and said foils, said bodies being arranged in the form of one plate having a plane light entrance surface and a plane light exit surface both planes lying parallel to one another, bands impervious to light arranged on said light entrance surface of said plate and between them forming light entrance bands, said interference layers and said reflecting layers lying in the inside of said plate and including an angle with the surface of said plate of larger than 45°, two of said layers lying behind each light transmitting band and part of one layer behind the part of the other layer or part of one layer behind part of the conceived prolongation within said plate, whereby the entering light impinges on one interference layer, said layer dividing the light in a transmitted portion of one polarization condition and a reflected portion of another polarization condition as the transmitted light, and directing the whole reflected portion to the second interference layer or a reflecting surface which directs the reflected light to the light exit surface of the plate, said phase retarding foils being arranged in the path of one of the portions of light to equal its polarization condition to the condition of the other portion of light.

Thus firstly the use of expensive glasses is avoided while on the other hand the advantages of the previously known designs are retained, the main advantage being the possibility that the entire polarizing body could be made as a sealed plane parallel plate. While in the known arrangements within each light entrance band the light impinges only on one polarizing surface because $\alpha=45°$, whereby losses of light as small as possible could be attained, in accordance with the invention the same advantage is realized in that behind each light entrance band lie at least two light dividing planes or at least one light dividing plane and the assumed extension, lying within the polarizer, of a reflecting plane parallel thereto, which serves for the reflection of the rays parallel to the light entrance direction. In order that beyond that no loss of light may occur at all, the equation (2)     $1 = k \cdot b / \cos \alpha$ applies in the further construction of the invention for the length 1 of the interference layers, for the width $b$ of the incident partial light beams and for the angle of incidence $\alpha$, where $k=1, 2, 3 \ldots$. The angle $\alpha$ is, in accordance with the above mentioned Equation 1 linked with the refractive indices of the materials used.

The distribution of the light dividing planes within the entire polarizer can be undertaken in various ways. In most cases one will arrange behind each light transmitting band and its neighbouring band which is impervious to light, hereafter called a period of the light entrance surface, the light dividing or reflecting planes in the same manner, whereby in general one will take the width of the light transmitting bands equal to the width of the bands impervious to light. Under these presuppositions there result several solutions for the distribution and arrangement of the light dividing planes which will be elucidated in detail in the accompanying figures. All figures in each case represent a section through the polarizer, which passes parallel to the direction of light entrance and perpendicular to the polarizing layers; in all examples the light exit surface of the polarizer forms a continuous plane whereon the light entrance surface may be a continuous plane or at least a multiplicity of plane bands lying in one plane parallel to the light exit plane.

Figure 2:
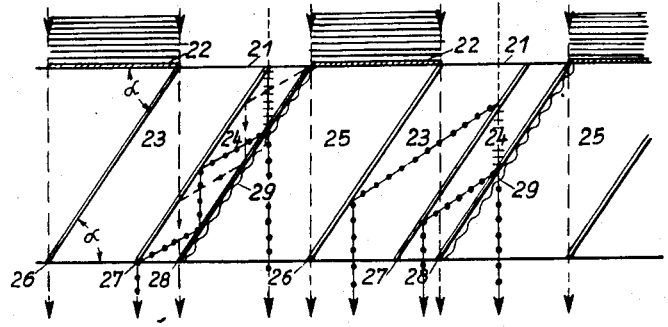
Figure 3:
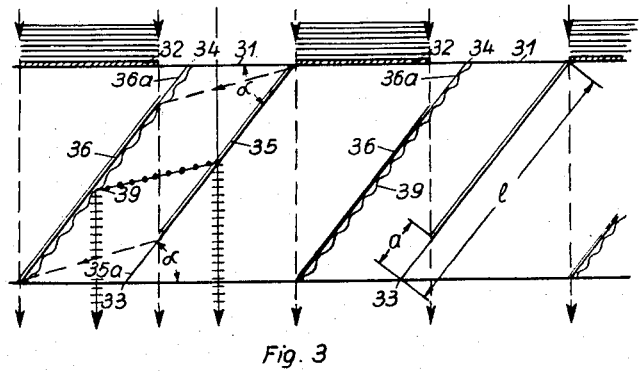
Figure 4:
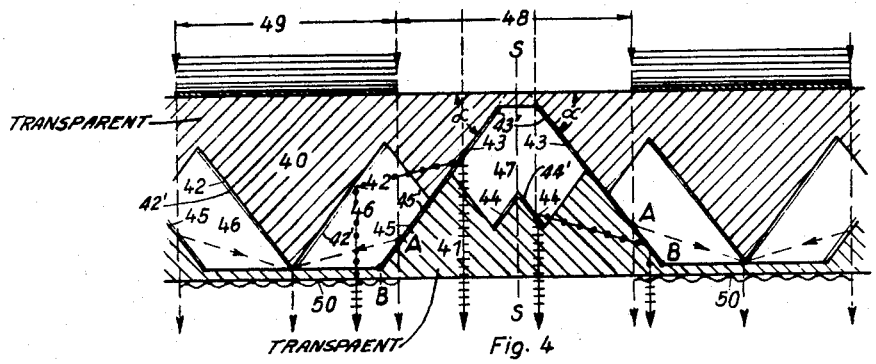
Figure 5:
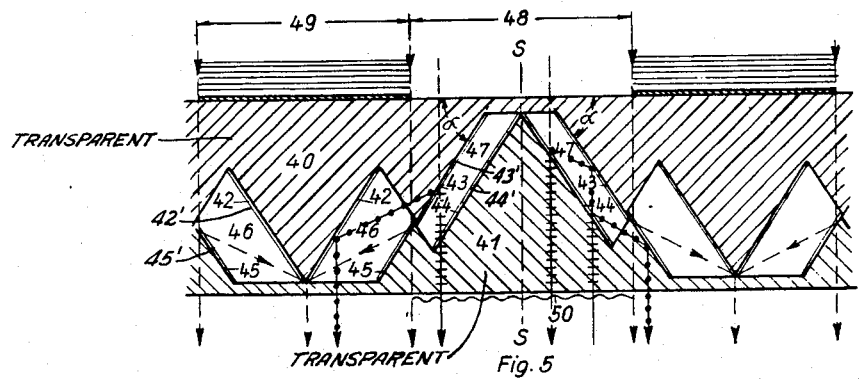
Figure 6:
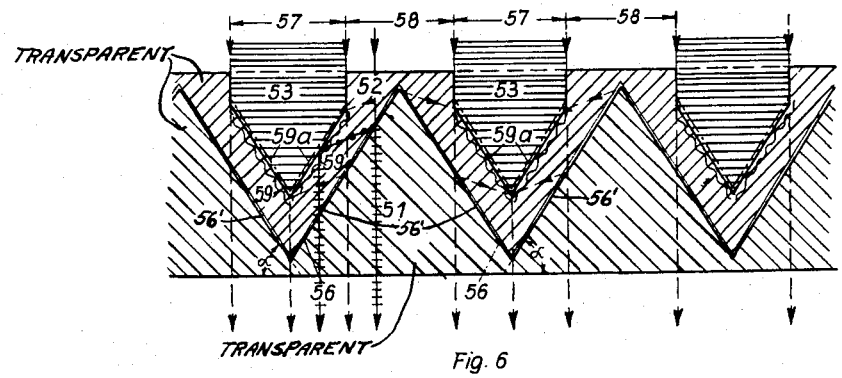

The figures show forms of construction of the invention as follows:

Fig. 1 one polarizer where two light dividing planes have been arranged behind the light entrance bands, whereby parts of these light dividing planes lay one behind the other, Fig. 2 one modified form of construction as per Fig. 1, Fig. 3 one polarizer where a light dividing plane is arranged behind the light entrance band and the assumed extension of a reflecting plane extends all the way behind the light entrance band, Fig. 4 one polarizer in accordance with Fig. 1 where, however, the dividing layers and the reflecting layers are arranged on the surfaces of pressed glass bodies, Fig. 5 a corresponding form of construction and Fig. 6 a modified form of construction as per Fig. 4, where, however, the reflecting layers and dividing layers are designed as in Fig. 3.

Fig. 1 shows first the basic construction of a polarizer corresponding to the invention. The light entrance surface is, as also in all remaining examples, periodically subdivided into light transmitting bands 11 and bands 12 impervious to light, both of equal width $b$. The polarizer behind each period consists of plane plates 13, 14 and 15, between which the light dividing polarizing layers 16, 17, and 18 are enclosed with optical contact. The layer systems 16, 17 and 18 in this first example can be assumed to be identical. The plates 13, 14, and 15 are so arranged that the polarizing layers lie at the angle $\alpha$ with the light entrance surface and the light exit surface which as already noted, with use of not highly refractive glass must be greater than 45°. The length of the light dividing planes determined by the inclined position of the plates, which in the drawing is denoted by $l$, corresponds to the above indicated Relation 2 between $b$, $\alpha$, and $l$. The bands on the light exit surface opposite the light entrance bands carry doubly refractive foil bands 19 which give the plane polarized light transmitted through them a phase difference $\lambda/2$, so that the total emerging light shows uniform polarization. For protection of the foils 19 a cover plate 20 is cemented on the light exit surface. As appears from Fig. 1 there are arranged behind each period of the light entrance surface given by the width $2b$, three light dividing planes 16, 17, 18; the mutual distances of these planes and the neighbouring plane 16 and therewith the thicknesses of the three individual glass plates 13, 14 and 15, respectively shall preferably be related as $$1:\frac{1}{m}:\left(\frac{m-1}{m}-2\cos 2\alpha\right) \qquad (3)$$

$m$ signifies a small positive whole number, which suitably is selected not greater than $$m \leq \frac{\tan^2\alpha+1}{\tan^2\alpha-1} \qquad (4)$$

By observing these conditions one has especially for $m=1$ aside from the complete polarization also the advantage, that the period of the light entrance bands can be displaced in the light entrance surface at will relative to the arrangement of the light dividing planes; moreover the boundaries of the said bands in the light entrance surface may not be parallel. One need then only take care, that the doubly refractive foil bands 19, seen in the direction of the rays, are everywhere bounded by the same rays (AB in Fig. 1), as the light entrance bands. For the case that the projection of a light dividing plane in the light entrance surface covers a band impervious to light this light dividing plane may be an ordinary reflecting layer. For illustrating the path of rays in the drawing the rays polarized perpendicular to the plane of the drawing are indicated by dots and the rays polarized parallel to the plane of the drawing by small horizontal lines.

While now in the example according to Fig. 1 the doubly refracting foils 19 are adjusted bandwise to coincide with the light transmitting bands of the light entrance surface and are protected by a cover plate 20, according to a further development of the invention these foils can also be mounted along a light dividing plane, which can mean an essential simplification for the production of the total polarizing body. Presupposition for such a solution is, that the projection of a light dividing plane in the light entrance surface covers exactly a light transmitting band and that the distances between the light dividing planes within the period stand in the ratio of whole numbers to one another. Fig. 2 shows the construction of such a polarizer. The light entrance surface is again periodically subdivided into light transmitting bands 21 and bands 22 impervious to light. The glass plates constituting the polarizer, inclined at an angle $\alpha$, are designated with 23, 24, and 25; between the plates are arranged the polarizing layers 26, 27, 28, whereby the doubly refractive foils 29 serving for unifying the state of polarization are at the same time applied on the layers 28. The projection of the foils 29 in the light direction in the light entrance plane covers light transmitting bands 21. The two sections into which the polarizing layers 27 subdivide the entrance width 21 and therewith also the thickness dimensions of the plates 23 and 24 stand in the ratio to one another:

$$\frac{\tan^2\alpha+1}{\tan^2\alpha-1}$$

Hence the demand for a whole numbered thickness ratio of the plates means, that the angle $\alpha$ must satisfy the equation $$\tan^2\alpha=\frac{m+1}{m-1} \qquad (5)$$

whereby $m=2, 3, 4 \ldots$

The angle $\alpha$ therefore can hereby assume the values: 60°, 54° 44′, 52° 14′, etc. For the practical execution one will select the values of $m$ so that the therewith resulting values of $\alpha$ stand in as good agreement as possible with the demands according to Equation 1. Let it further be mentioned that behind each light transmitting band may be arranged instead of the one light dividing plane 27 several light dividing planes, whereby these light dividing planes must have distances being in a whole numbered partition ratio.

In the hitherto described polarizers the light dividing planes are so arranged, that the light beams going through without reflection at least in part pass through two or more polarizing layer systems. If one wants to avoid this one must take care, that in each period of the light entrance surface only one polarizing light dividing plane becomes effective. Such an arrangement is illustrated by Fig. 3. The light entrance surface is again uniformly subdivided into light transmitting bands 31 and bands 32 impervious to light. Behind each period of the light entrance surface the light dividing planes 33 and 34, are arranged in which the polarizing or reflecting layers 35 and 36 are mounted. In this example the layer 36 may be also a simple reflecting layer. Both layer systems 35 and 36 have an extent so that their projection in the light entrance surface covers the light transmitting band 31 and the band 32 impervious to light. In spite of that the idea of the invention is observed, because the prolongation of the layer plane 36 beyond the coated part (the prolongation in the drawing is designated with 36a) is traversed by the same light beam which passes the neighbouring layers 35. In corresponding manner, on the light exit side, the lower part of the layer plane 35, designated with 35a, remains free of polarizing layers, therefore allows the rays reflected at 36 to pass out directly. Hereby the distance between the layers 35 and 36 and therewith the thickness of the plates are related as:

$$(\tan\alpha\cdot\tan^2\alpha-1):(\tan\alpha\cdot\tan^2\alpha+1) \qquad (6)$$

If one again designates the length of the light dividing planes lying within the plates with $l$ and the upper, or the lower part of this length in each case remaining free of the polarizing or the reflecting layers with $a$, then the ratio $a/l$ is:

$$\frac{a}{l}=\frac{1}{1-\tan\alpha\cdot\tan^2\alpha} \qquad (7)$$

The doubly refracting foils (designated in Fig. 3 with 39) serving for unifying the vibration direction can here, just as in the example according to Fig. 1, be applied on the light exit surface either for the rays passing through, or, as represented in Fig. 3, for the reflected rays. In case the layer 36 forms an ordinary reflecting surface, the embedding of the suitably adjusted foils 39 takes place directly in front of the reflecting surface 36.

For practical production of polarizers of the hitherto described kind one appropriately employs plane plates of plate or window glass, whose thickness, with consideration of layer and cement thicknesses and the period of the light entry surface is so regulated that the desired dimensional ratios arise. The individual plates after coating them with the polarizing or reflecting layers, which can be done in accordance with familiar methods, can be cemented together and then cut up at the angle α to the light dividing planes into plane parallel pieces of the required thickness and polished. In order to thereby avoid tearing up the cement surface between the individual plates, it is advisable to use not too brittle cement, e. g., polymerizing plastic cements. Instead of applying the polarizing layers directly on the glass bodies, one can naturally also precipitate them on transparent foils, e. g. of cellulose acetate, polystyrene, polyvinyl alcohol, or the like, and then cement these between the glass plates.

The hitherto indicated execution forms of polarizers demand a certain expenditure of mechanical workmanship, especially in sawing up and polishing the plate sets. According to a further development of the invention this expenditure can be avoided, if one so fabricates the polarizing and reflecting layer-bearing glass or plastic bodies, that they can be produced by pressing, so that in general they no longer require any supplementary working. Execution forms which correspond to this principle can be specified in very great numbers, each according to the arrangement of the polarizing and reflecting layers. The Figures 4 and 5 give two examples for this. In both examples the execution is so chosen that in the cross section of the polarizer within each period of the light-entrance surface a symmetrical form of the polarizer results, that is symmetrical to the mean perpendicular S—S of the light transmitting band. Parts of the same kind in these two examples are designated with the same reference numbers. Both polarizers consist each of an upper plate 40 with the plane light-entrance surface periodically subdivided into light transmitting bands 48 and bands 49 impervious to light and of a lower plate 41 which carries on the light-exit side, located below, the doubly refractive foils 50 for unifying the vibration direction. The facing sides of the two plates are so profiled that they precisely fit into one another and thereby carry on the surfaces 42, 43, 44, and 45, inclined at an angle of α to the light-entrance direction, the required polarizing layers 42', 43', 44', and 45'. Thereby the layers of the surfaces 42 and the layers of the surface 45 between the points A and B can also be replaced by reflecting layers. The hollow spaces 46 and 47 remaining between the two plates 40 and 41 can for example be filled with cement masses or liquid of the same refractive index as that of the bodies 40 and 41. For avoiding strains with change in temperature it is more favorable to fill these spaces with glass strips of prismatic shape, which likewise can be produced as pressed pieces. Plates and filling bodies then can be cemented into a coherent stable body. For the mutual distances between surfaces 42, 43, 44, and 45 the relations again hold which were determined above by the Equations 3, 4; the lengths of these surfaces resulting in the plane of the drawing in each case should be just so large that the one vibration component of each arriving ray experiences in total an even-numbered number of reflections at these surfaces. The doubly refractive foils 50 again are cemented band-shaped on the light-exit surface, namely in Fig. 4 so that the foils, seen against the light direction, coincide with the light-blocking bands 49, while in Fig. 5 they lie opposite the light-entrance bands 48.

A further execution form of a polarizer fashioned of pressed bodies, which shows special advantages with regard to production, is represented by Fig. 6. It consists of a pressed plate 51 whose cross section is formed of a continuous row of isosceles triangles. The base of the isosceles triangles is equal to the period of the light-entrance surface; the sides of the triangles designated by 56 are inclined at the angle α to the light-entrance opening. All the oblique surfaces 56 of the prisms of plate 51, triangular in cross section, are covered with polarizing layers 56'. On the plate 51 is cemented a second pressed plate 52, likewise with saw-toothed cross section, which precisely engages the prismatic teeth of 51 and shows for each period of the light-entrance surface a V-shaped recess 53. The oblique surfaces of the V-shaped recesses are parallel to the surfaces 56 and carry the doubly refractive foils 59, serving for turning the direction of vibration in the above mentioned manner, as well as a reflecting layer 59a. The upper boundary of the plate 52 constitutes the light-entrance surface, which again is subdivided into light transmitting bands 58 and bands 57 impervious to light. The distance of the reflecting surfaces 59a from the respective polarizing layers 56 amounts to $$\frac{b}{4 \sin \alpha}$$

wherein $b$ designates the width of the light-entrance bands 58, which is equal to half the base of the triangles of 51. The upper part of the V-shaped recesses of the plate 52, which limits the width of the light-entrance bands, runs parallel to the light-entrance direction. The hollow spaces 53 formed in this manner can in this example either remain open or also, say for protection of the layers 59 and 59a, be filled with an optional substance. A special advantage of this execution form consists, amongst others, therein that a depolarization of the light which may be caused by imperfection of the foils is eliminated by a second passage through the layers 56. If in this execution form one leaves the hollow spaces 53 open, then the reflecting layers 59a also can be omitted, since then total reflection takes place on the outer side of foils 59. The thickness of the foils in this case must naturally be so adjusted corresponding to the additional phase difference effected by the total reflection, that in total a retardation of λ/2 is brought about by the reflection.

In the production of such polarizers it is desirable that not too high demands be made on the surface quality of the upper plate 52. This is then the case, if the hollow spaces 53 are filled with a cemented-in prism bands whose oblique surfaces are precisely worked and metalized. The prisms 53 then ensure the correct distance between the polarizing layers 56 and the reflecting layers 59a. Further it is particularly advantageous with this execution form if one does not apply the polarizing layers 56 on the pressed plates themselves but on a cohering film, which then is squeezed in between the pressed plates 51 and 52. In case the edges of the pressed bodies are somewhat rounded off, it is advisable to impart in a sharp-edged matrix the precise form to the polarizing film after application of the layers. In this manner polarization losses are largely avoided at the edges of the pressed bodies.

The described polarizers can be used with special advantage for headlights e. g. for the purpose of glare-free vehicular traffic. Equally well however they can also be used for example in stereoprojection apparatus which depends on the application of polarized light.

We claim:

1. A polarizer for the production of uniformly polarized light especially in headlights and stereoprojectors having polarizing interference layers and reflecting layers as well as phase retarding foils, solid light transmitting bodies carrying said layers and said foils, said bodies being arranged in the form of a plate and having a plane light entrance surface and a spaced plane light exit surface both planes lying parallel to one another, bands impervious to light arranged on said light entrance surface and between them forming light entrance bands, said interference layers and said reflecting layers lying between said bodies intermediate the entrance and exit surfaces and spaced from one another and parallel to one another, the layers being at an angle with the light entrance surface of larger than 45° but smaller than 90°, two of said interference layers lying behind each light transmitting band and part of one interference layer behind part of the other layer, whereby the entering light through each light transmitting band impinges on both interference layers, said layers polarizing and dividing the light in transmitting portions and reflecting portions having another plane of polarization as the transmitted portion, said two interference layers and said reflecting layers being arranged so that one of the two interference layers directs the reflected portion of light to the other of the two interference layers which directs this portion to the exit surface of the plate and said other interference layer directs the reflected portion of polarized light produced by it to one of said reflecting surfaces, this surface reflecting said portion to the exit plane, said phase retarding foils being arranged in the path of one of the portions of light to rotate its polarization axis parallel to the axis of the other portion of light.

2. In a polarizer according to claim 1, the phase retarding foils are arranged in the exit surface of the plate behind the light entrance bands.

3. Polarizer according to claim 1, characterized in that for the length $l$ of said light dividing planes, for the width $b$ of said light transmitting bands and for the angle of incidence $\alpha$ of light on the said light dividing and reflecting planes the following applies:

$$l = k \cdot b / \cos \alpha$$

whereby $k = 1, 2, 3. \ldots$

4. Polarizer according to claim 1, characterized in that said light transmitting bands and said bands impervious to light in said light entrance surface are at least in pairs equally large and that behind each of said light transmitting bands and the neighbouring band which is impervious to light at least three of the light dividing planes and reflecting planes are arranged.

5. Polarizer according to claim 1, characterized in that said light transmitting bands and said bands impervious to light in said light entrance surface are at least in pairs equally large and that behind each of said light transmitting bands and the neighbouring band which is impervious to light at least three of the light dividing planes and reflecting planes are arranged and in that the distance between the first four light dividing and reflecting planes, arranged behind each of the light transmitting bands and the neighbouring band which is impervious to light is as $$l : \frac{1}{m} : \left( \left( \frac{m-1}{m} \right) - 2 \cos 2\alpha \right)$$

whereby $\alpha$ signifies the angle of incidence of the light on the said light dividing planes or reflecting planes and $m$ a small positive whole number.

6. Polarizer according to claim 1 characterized in that said light transmitting bands and said bands impervious to light in said light entrance surface are at least in pairs equally large and that behind each of said light transmitting bands and the neighbouring band which is impervious to light at least three of the light dividing planes and reflecting planes are arranged and in that the distance between the first four light dividing and reflecting planes, arranged behind each of the light transmitting bands and the neighbouring band which is impervious to light is as $$l : \frac{1}{m} : \left( \left( \frac{m-1}{m} \right) - 2 \cos 2\alpha \right)$$

whereby $\alpha$ signifies the angle of incidence of the light on the said light dividing planes or reflecting planes and $m$ a small positive whole number, $m$ fulfilling the condition $$m = \frac{\text{tg}^2 \alpha + 1}{\text{tg}^2 \alpha - 1}$$

7. Polarizer according to claim 1, characterized in that said light transmitting bands and said bands impervious to light in said light entrance surface are at least in pairs equally large and that behind each of said light transmitting bands and the neighbouring band which is impervious to light three of the light dividing planes and the reflecting planes are arranged and that the distance between the first four light dividing and reflecting planes arranged behind each of the light transmitting bands and the neighbouring band which is impervious to light is as $$l : \frac{1}{m} : \left( \left( \frac{m-1}{m} \right) - 2 \cos 2\alpha \right)$$

whereby $\alpha$ signifies the angle of incidence of the light on the said light dividing planes or reflecting planes and $m = 1$.

8. Polarizer according to claim 1, characterized in that the light dividing planes, which are struck only by rays reflected in the polarizer, are formed of ordinary reflecting layers.

9. Polarizer according to claim 1, characterized in that behind each of said light transmitting bands and its neighbouring band which is impervious to light one of the said light dividing planes is arranged in such a way that its projection in the direction of the light entrance surface covers as accurately as possible said light entrance band and the distances between said light dividing and reflecting planes which are arranged behind said light transmitting band and its neighbouring band which is impervious to light stand in the ratio of whole numbers to one another.

10. Polarizer according to claim 1, characterized in that behind each of said light transmitting bands and its neighbouring band which is impervious to light one of the said light dividing planes is arranged in such a way that its projection in the direction of the light entrance surface covers as accurately as possible said light entrance band and the distances between said light dividing and reflecting planes which are arranged behind said light transmitting band and its neighbouring band which is impervious to light stand in the ratio of whole numbers to one another and that the said light dividing planes are formed of layers of different refractive indices and are arranged in such a way that the angle $\alpha$ at which the light is incident, fulfills the two conditions:

$$\sin^2 \alpha = \frac{n_h^2 \cdot n_t^2}{n_g^2 \cdot (n_h^2 + n_t^2)} \text{ and } \text{tg}^2 \alpha = \frac{m+1}{m-1}$$

wherein $n_h$ signifies the refractive index of the high-refractive layers and $n_t$ signifies the refractive index of the low-refractive layers and $n_g$ signifies the refractive index of said transparent bodies embodying the light dividing planes and $m$ can take the values $2, 3, 4. \ldots$ 11. Polarizer according to claim 1, characterized in that behind each of said light transmitting bands and its neighbouring band which is impervious to light one of the said light dividing planes is arranged in such a way that its projection in the direction of the light entrance surface covers as accurately as possible said light entrance band and the distances between said light dividing and reflecting planes which are arranged behind said light transmitting band and its neighbouring band which is impervious to light stand in the ratio of whole numbers to one another and that as phase retarding foils doubly refractive foils are arranged in those light dividing planes whose projections in the direction of the light entrance surface coincide with said light transmitting bands.

12. Polarizer according to claim 1, characterized in that said light transmitting bands and said bands which are impervious to light are of equal width and behind each of said light transmitting bands and its neighbouring band which is impervious to light two dividing and reflecting planes are provided, whose mutual distances are as:

$$(\text{tg}\alpha \cdot \text{tg}^2\alpha - 1) / (\text{tg}\alpha \cdot \text{tg}^2\alpha + 1)$$

whereby $\alpha$ is the angle of incidence of light onto the light-dividing planes and that said interference layers and said reflecting layers are brought onto the glass bodies only so far that the projection of these interference layers and reflecting layers in the direction of the light entrance surface covers one of said light transmitting bands.

13. Polarizer according to claim 1, characterized in that said light transmitting bands and said bands which are impervious to light are of equal width and behind each of said light transmitting bands and its neighbouring band which is impervious to light two dividing and reflecting planes are provided, whose mutual distances are as:

$$(tg\alpha \cdot tg^2\alpha - 1)/(tg\alpha \cdot tg^2\alpha + 1)$$

whereby $\alpha$ is the angle of incidence of light onto the light dividing planes and that said interference layers and said reflecting layers are brought onto the glass bodies only so far that the projection of these interference layers and reflecting layers in the direction of the light entrance surface covers one of said bands which are impervious to light, and that the conceived prolongation of the reflecting layer in said plate lies behind the light entrance surface.

14. Polarizer according to claim 1, characterized in that said light transmitting bands and said bands which are impervious to light are of equal width and behind each of said light transmitting bands and its neighbouring band which is impervious to light two dividing and reflecting planes are provided, whose mutual distances are as:

$$(tg\alpha \cdot tg^2\alpha - 1)/(tg\alpha \cdot tg^2\alpha + 1)$$

whereby $\alpha$ is the angle of incidence of light onto the light dividing planes and that said interference layers and said reflecting layers are brought onto the glass bodies only so far that the projection of these intererfrence layers and reflecting layers in the direction of the light entrance surface covers one of said light transmitting bands and that the conceived prolongation of the reflecting layer in said plate lies behind the light entrance surface.

15. Polarizer according to claim 1, characterized in that as phase retarding foils doubly refractive foils are arranged in the planes of the reflecting layers.

16. Polarizer according to claim 1, characterized in that said light transmitting bodies consist of glass plates which are cemented with plastic cements to form a coherent body.

17. Polarizer according to claim 1, characterized in that said light transmitting bodies consist of plastic plates which are cemented with plastic cements to form a coherent body.

18. Polarizer according to claim 1, characterized in that said interference layers and reflecting layers are brought onto transparent foils which are cemented onto said transparent bodies.

19. Polarizer according to claim 1, characterized in that said light transmitting bodies carrying said interference layers and said reflecting layers consist at least in part of pressed plastic materials.

20. Polarizer according to claim 1, characterized in that said light transmitting bodies carrying said interference layers and said reflecting layers consist at least in part of pressed plastic materials and that said light dividing planes and said reflecting planes are arranged symmetrically to a plane perpendicular to the light entrance surface and to the plane of incidence of light.

21. Polarizer according to claim 1, characterized in that said light transmitting bodies carrying said interference layers and said reflecting layers consist at least in part of pressed plastic materials and that in the cross section of the polarizer the length of the said light dividing planes and the said reflecting planes is dimensioned in such a way that the one vibration component of each arriving light beam permeating the polarizer undergoes an even numbered amount of reflections at these planes.

22. Polarizer according to claim 1, characterized in that it is formed of two pressed plates cemented to one another and that the cross section of the one plate consists of a continuous row of saw toothed isosceles triangles whose bases are equal to the length of said light transmitting bands and its neighbouring bands which are impervious to light and whose angle sides carrying the said polarizing layers are inclined at the angle $\alpha$ to the direction of light entrance while the second plate which is cemented therewith, with same profiling, exactly engages the first plate, however, shows on its upper surface constituting the light entrance side V-shaped recesses whose oblique surfaces run parallel to the oblique surfaces of said first plate and carry the said phase-retarding foils as well as the said reflecting layers, whereby the distances between the oblique surfaces of the said second plate and the neighbouring light dividing planes are $b/4 \cdot \sin \alpha$ when $b$ is the width of said light transmitting band.

23. Polarizer according to claim 1, characterized in that it is formed of two pressed plates cemented to one another and that the cross section of the one plate consists of a continuous row of saw toothed isosceles triangles whose bases are equal to the length of said light transmitting bands and its neighbouring bands which are impervious to light and whose angle sides carrying the said polarizing layers are inclined at the angle $\alpha$ to the direction of light entrance while the second plate which is cemented therewith, with same profiling, exactly engages the first plate, however, shows on its upper surface constituting the light entrance side V-shaped recesses whose oblique surfaces run parallel to the oblique surfaces of said first plate and carry the said phase-retarding foils as well as the said reflecting layers, whereby the distances between the oblique surfaces of the said second plate and the neighbouring light dividing planes are $b/4 \cdot \sin \alpha$ when $b$ is the width of said light transmitting band and that instead of at least several of the said reflecting layers of said oblique surfaces of the second plate the total reflection of the phase-retarding foils applied on these surfaces and on the cover plates cemented to these foils is utilized.

24. Polarizer according to claim 1, characterized in that said phase retarding foils are brought into said light exit surface of the polarizer in the form of bands.

References Cited in the file of this patent

UNITED STATES PATENTS

| | | |
|---|---|---|
| 1,733,915 | Short | Oct. 29, 1929 |
| 1,963,127 | Gardner | June 24, 1934 |
| 2,403,731 | MacNeille | July 9, 1946 |
| 2,449,287 | Flood | Sept. 14, 1948 |
| 2,476,014 | Wright | July 12, 1949 |
| 2,492,809 | Marks | Dec. 27, 1949 |
| 2,748,659 | Geffcken et al. | June 5, 1956 |

FOREIGN PATENTS

| | | |
|---|---|---|
| 460,666 | Great Britain | Jan. 28, 1937 |